US011708846B2

(12) United States Patent
Tran et al.

(10) Patent No.: US 11,708,846 B2
(45) Date of Patent: Jul. 25, 2023

(54) CONNECTION DEVICE

(71) Applicants: Trang Tran, Lakewood, CO (US); Kurt Bulawa, Lakewood, CO (US)

(72) Inventors: Trang Tran, Lakewood, CO (US); Kurt Bulawa, Lakewood, CO (US)

( * ) Notice: Subject to any disclaimer, the term of this patent is extended or adjusted under 35 U.S.C. 154(b) by 494 days.

(21) Appl. No.: 17/020,717

(22) Filed: Sep. 14, 2020

(65) Prior Publication Data

US 2020/0408234 A1 Dec. 31, 2020

Related U.S. Application Data

(63) Continuation-in-part of application No. 16/174,365, filed on Oct. 30, 2018, now abandoned.

(51) Int. Cl.
*F16B 7/04* (2006.01)
*B29C 65/00* (2006.01)

(52) U.S. Cl.
CPC ...... *F16B 7/0413* (2013.01); *B29C 66/12421* (2013.01)

(58) Field of Classification Search
CPC ... F16L 11/042; F16L 9/12; F16L 9/17; F16L 9/22; A47G 21/18; F16B 5/0692; F16B 5/125; F16B 5/126; F16B 7/04; F16B 7/0413

See application file for complete search history.

(56) References Cited

U.S. PATENT DOCUMENTS

| 4,865,890 A | * | 9/1989 | Erlichman | B29C 61/10 138/167 |
| 4,944,976 A | * | 7/1990 | Plummer, III | H02G 3/0481 178/92 |
| 6,020,560 A | * | 2/2000 | Kamel | H02G 3/0481 174/138 R |
| 8,859,898 B2 | * | 10/2014 | Frye | H02G 3/0481 174/99 R |
| 9,482,381 B1 | * | 11/2016 | Hjelt | B29C 41/003 |
| 2018/0160831 A1 | * | 6/2018 | Yoo | A47G 21/18 |
| 2020/0163477 A1 | * | 5/2020 | Fung | A47G 21/18 |

(Continued)

FOREIGN PATENT DOCUMENTS

| CN | 108703614 A | * | 10/2018 | A47G 21/18 |
| CN | 212165530 U | * | 12/2020 | A47G 21/18 |

(Continued)

*Primary Examiner* — Daniel J Wiley
(74) *Attorney, Agent, or Firm* — Roger A. Jackson

(57) ABSTRACT

A connection device between a first member and a second member that includes a flexible male configuration disposed on the first member, the male configuration includes a finger extension that has a necked portion and an expanded terminating head portion. Also included is a flexible female configuration disposed on the second member, the female configuration includes a cavity having a narrow duct portion that expands into a chamber portion. The male and female configurations are removably engageable to one another, as the expanded head portion is manually pushed into the narrow duct portion and continuing further to manually push the expanded head portion into the chamber portion until the expanded head portion bottoms out into the chamber portion resulting in the first and second members being in a substantially fluid tight connection to one another.

4 Claims, 12 Drawing Sheets

(56) References Cited

U.S. PATENT DOCUMENTS

| | | | | |
|---|---|---|---|---|
| 2020/0323374 A1* | 10/2020 | Wang | ................... | A47G 21/18 |
| 2021/0085109 A1* | 3/2021 | Chen | ................... | A47G 21/18 |
| 2021/0212490 A1* | 7/2021 | Hong-Lin | ............... | A47G 21/18 |

FOREIGN PATENT DOCUMENTS

| | | | | |
|---|---|---|---|---|
| DE | 19836111 A1 * | 2/2000 | ............ | F16L 11/042 |
| HK | 1253655 A2 * | 6/2019 | ............ | A47G 21/18 |
| WO | WO-2019242002 A1 * | 12/2019 | | |

\* cited by examiner

CONNECTION DEVICE

RELATED APPLICATION

This application is a continuation in part of U.S. patent application Ser. No. 16/174,365 filed on Oct. 30, 2018 by Trang Tran of Lakewood, Colo., U.S., and Kurt Bulawa of Lakewood, Colo., U.S.

FIELD OF THE INVENTION

The present invention is generally related to flexible removably engageable connections and more particularly to flexible removably engageable connections that are substantially fluid tight that run approximately parallel to an axial axis of a re-useable straw in the form of a surrounding sidewall with open ends, wherein the connection facilitates the manual opening of the inside of the straw for cleaning and allows the manual re-closing of the connection to make the straw functional for its normal usage.

BACKGROUND OF THE INVENTION

Disposable plastic articles have become a serious environmental problem in current times with the common plastic straw being a part of the problem in causing pollution and harming wildlife. One solution is to return to biodegradable paper straws or to use bamboo as an alternative, however, due to economics the disposable plastic straw is overwhelmingly used for sanitation reasons, plus the high cost of recycling plastics is compounded by the wide variety of plastics with different levels of recyclability, making plastics recycling especially with plastic straws not a viable option currently.

Thus there exists a need for a reusable straw to use that has the major requirement to be easy to clean for sanitary purposes, there does exist currently for hard plastic straws, long thin brush cleaners which can get the job done for cleaning the hard plastic straw interior, however, being somewhat difficult to use to thoroughly cleaning the inside of the straw which has restricted accessibility. More ideally, a re-usable straw would not require any separate cleaning utensils to be sanitized, thus requiring the re-usable straw to have the interior easily accessible for cleaning, which would create the need for the straw interior to be easily accessible. One solution is to facilitate the re-usable straw to be openable for cleaning, thus exposing the straw interior for easy manual cleaning, this would require a re-sealable and substantially fluid tight split margin along the straw axial length being the design challenge, this is where the present invention has its focus which is to accommodate the fluid tight split margin in the flexible straw surrounding sidewall.

SUMMARY OF INVENTION

Broadly, the present invention is a connection device between a first member and a second member that includes a flexible male configuration disposed on a first distal end portion of the first member, the male configuration includes a finger extension having a proximal end portion and an opposing distal end portion with a first member longitudinal axis spanning therebetween the finger extension proximal and distal end portions, wherein the finger extension proximal end portion has a necked portion with a necked portion volume and the finger extension distal end portion has an expanded head portion having an expanded head portion volume.

Also included is a flexible female configuration disposed on a second distal end portion of the second member, the female configuration includes a cavity that is constructed of a narrow duct portion defined by a narrow duct portion boundary that expands into a chamber portion defined by a chamber portion boundary with a second member longitudinal axis spanning therebetween the narrow duct portion and the chamber portion. Wherein the narrow duct portion has a narrow duct portion void volume and the chamber portion has a chamber portion void volume, wherein the first member longitudinal axis and the second member longitudinal axis are coincident to one another, wherein the narrow duct portion void volume is less than the necked portion volume and the chamber portion void volume is less than the expanded head portion volume resulting in a primary interference fit as between the narrow duction portion and the necked portion and a secondary interference fit as between the chamber portion and the expanded head portion resulting in a substantially fluid tight connection as between the first and second members. Wherein as both the male and female configurations are flexible they are removably engageable to one another, wherein operationally the first member longitudinal axis and the second member longitudinal axis are positioned coincident to one another and the expanded head portion is manually pushed into the narrow duct portion and continuing further to manually push the expanded head portion into the chamber portion until the expanded head portion bottoms out into the chamber portion resulting in the first and second members being in the substantially fluid tight connection to one another in a connected state, to separate the first and the second members from one another manually pull apart the first and second members from one another into a separated state with the first member longitudinal axis and the second member longitudinal axis being positioned coincident to one another.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
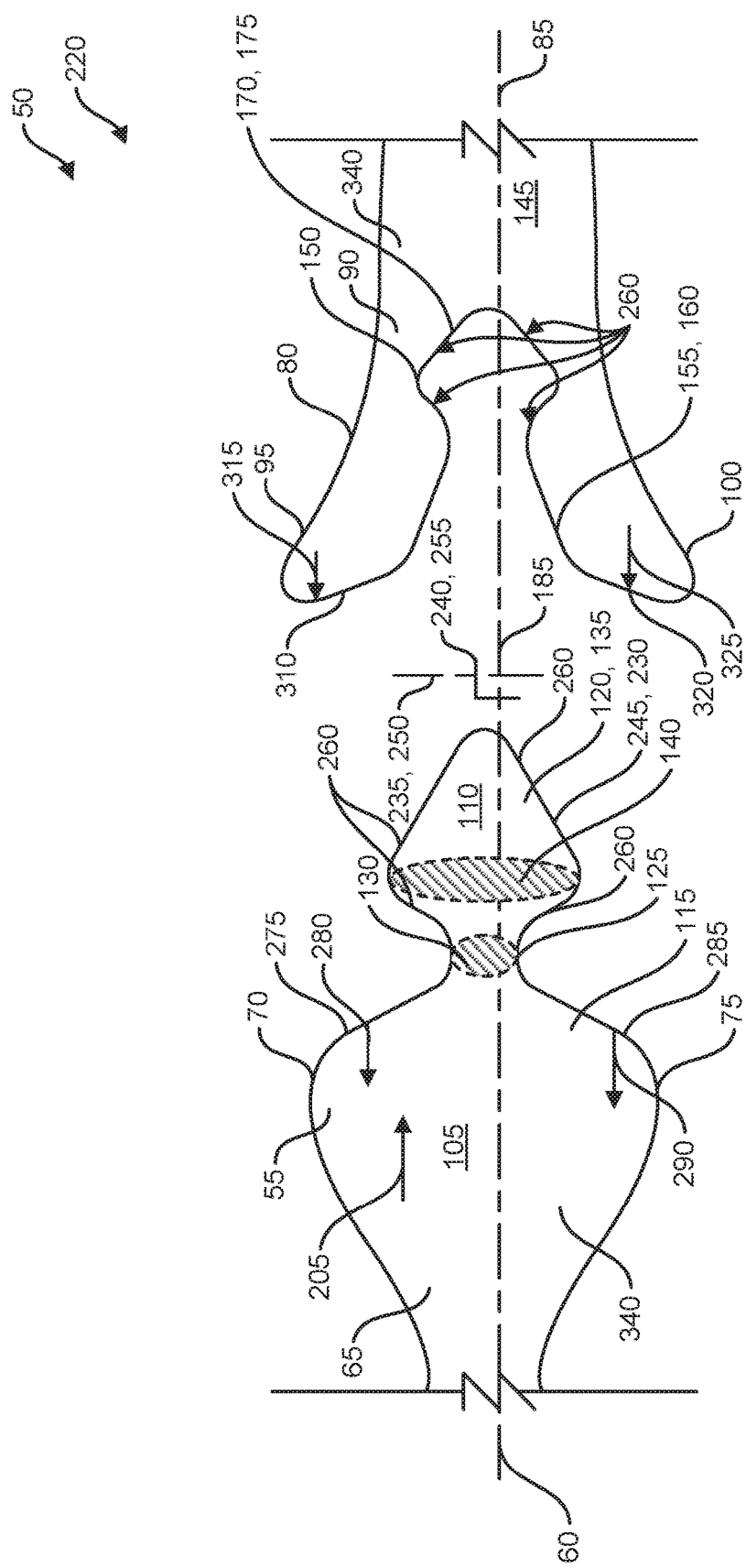
FIG. 1 shows a cross sectional view of the separated state of the first member flexible male configuration and the second member flexible female configuration, wherein the flexible male configuration includes the necked portion and the expanded head portion and the flexible female configuration includes the narrow duct portion and the chamber portion, the FIG. 1 view is shown as taken from FIGS. 3 and 6.

50 Connection device
55 First member or first margin member
60 First member 55 or first margin member 55 longitudinal axis
65 First distal end portion of the first member 55 or first margin member 55
70 First outer margin of the first member 55 or first margin member 55
75 First inner margin of the first member 55 or first margin member 55
80 Second member or second margin member
85 Second member 80 or second margin member 80 longitudinal axis
90 Second distal end portion of the second member 80 or second margin member 80
95 Second outer margin of the second member 80 or second margin member 80
100 Second inner margin of the second member 80 or second margin member 80
105 Flexible male configuration
110 Finger extension of the flexible male configuration 105
115 Proximal end portion of the finger extension 110
120 Distal end portion of the finger extension 110
125 Necked portion of the finger extension proximal end portion 115
130 Necked portion volume of the finger extension proximal end portion 115
135 Expanded head portion of the finger extension distal end portion 120
140 Expanded head portion volume of the finger extension distal end portion 120
145 Flexible female configuration
150 Cavity of the flexible female configuration 145
155 Narrow duct portion of the cavity 150
160 Narrow duct portion 155 boundary
165 Narrow duct portion 155 void volume
170 Chamber portion of the cavity 150
175 Chamber portion 170 boundary
180 Chamber portion 170 void volume
185 Coincident position of the first 55 and second 80 members or first 55 and second 80 margin members respective longitudinal axes 60, 85
190 Primary interference fit between the narrow duct portion 155 and the necked portion 125

195 Secondary interference fit between the chamber portion 170 and the expanded head portion 135
200 Substantially fluid tight connection as between the first member 55 or first margin member 55 and second member 80 or second margin member 80
205 Manual pushing of the expanded head portion 135 into the chamber portion 170
210 Bottoming out of the expanded head portion 135 into the chamber 170 in the connected state 215
215 Connected state of the first 55 and second 80 members or first 55 and second 80 margin members to one another
220 Separated state of the first 55 and second 80 members or first 55 and second 80 margin members to one another
225 Manually pull apart of the first 55 and second 80 members or first 55 and second 80 margin members to one another into the separated state 220
230 Rhombus cross sectional shape of the expanded head portion 135
235 First plane
240 Perpendicular position of the first plane 235 to the first member 55 or first margin member 55 longitudinal axis 60
245 Rhombus cross sectional shape of the chamber portion boundary 175
250 Second plane
255 Perpendicular position of the second plane 250 to the second member 80 or second margin member 80 longitudinal axis 85
260 Series of four flat surfaces of the secondary interference fit 195
265 Adjacent position of the first 70 and second 95 outer margins
270 Adjacent position of the first 75 and second 100 inner margins
275 First outer angled surface
280 First direction away of the first outer angled surface 275 from the expanded head portion 135
285 First inner angled surface
290 Second direction away of the first inner angled surface 285 from the expanded head portion 135
295 Compression of the first 55 and second 80 members or first 55 and second 80 margin members toward one another
300 First outer 275 and inner 285 angled surfaces reducing the primary interference fit 190
305 Driving further of the expanded head portion 135 into the chamber portion 170
310 Second outer angled surface
315 Third direction away of the second outer angled surface 310 from the chamber portion 170
320 Second inner angled surface
325 Fourth direction away of the second inner angled surface 320 from the chamber portion 170
335 First 275, 285 and second 310, 320 respectively outer and inner angled surfaces reducing the primary interference fit 190
340 Flexible surrounding sidewall
345 Long axis of the flexible surrounding sidewall 340
350 Substantially parallel position of the long axis 345 to the first 55 and second 80 margin members
355 First end margin
360 Second end margin
365 Perpendicular position of the long axis 345 to the first 355 and second 360 end margins

DETAILED DESCRIPTION

Figure 3:
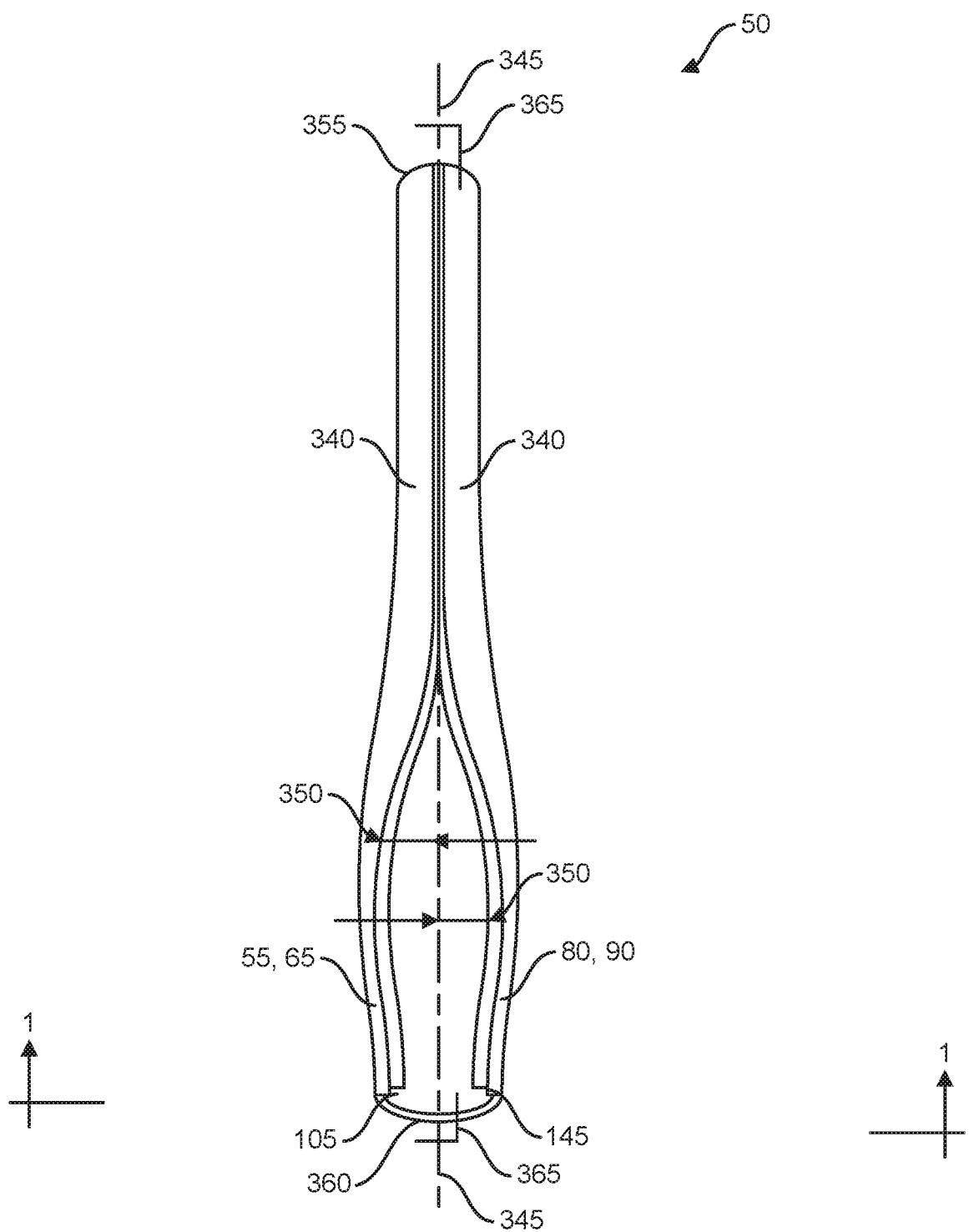
FIG. 3 shows a lower perspective view of the connection device with the flexible surrounding sidewall having the flexible male and female configurations partially in the separated state and partially in the connected state to show the flexible sidewall first and second margin members connected in the substantially fluid tight connection and the flexible sidewall first and second margin members in the separated state, wherein the flexible surrounding sidewall in the connected state can function as a straw and the flexible surrounding sidewall in the separated state facilitating easy cleaning on the straw interior.
Figure 6:
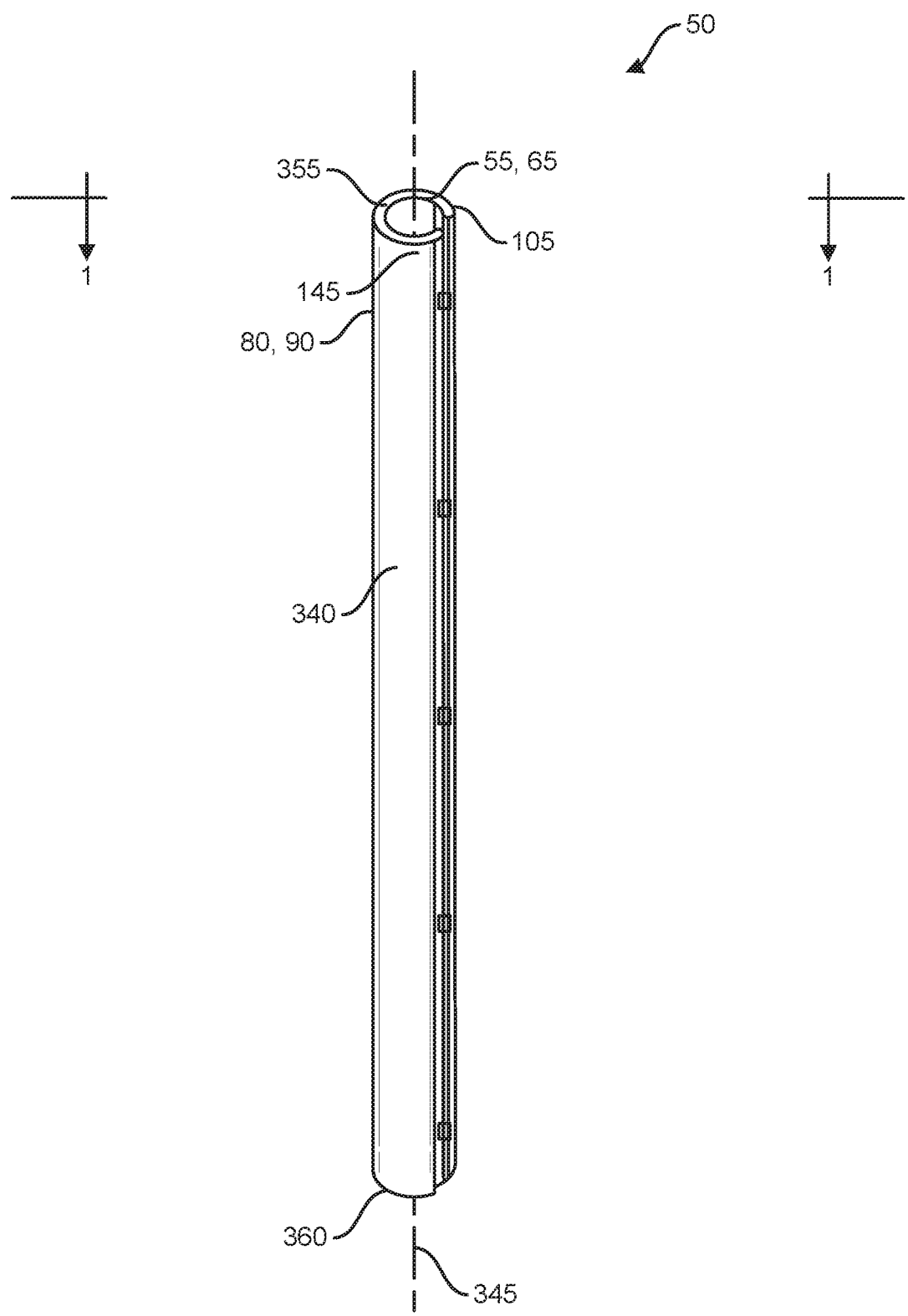
FIG. 6 shows a upper perspective view of the connection device with the flexible surrounding sidewall having the flexible male and female configurations in the separated state to show the flexible sidewall first and second margin members in the separated state, wherein the flexible surrounding sidewall in the separated state facilitating easy cleaning of the straw interior.

With initial reference to FIG. 1 shown is the a cross sectional view of the separated state 220 of the first member 55 flexible male configuration 105 and the second member 80 flexible female configuration 145, wherein the flexible male configuration 105 includes the necked portion 125 and the expanded head portion 135 and the flexible female configuration 145 includes the narrow duct portion 155 and the chamber portion 170, the FIG. 1 view is shown as taken from FIGS. 3 and 6.

Figure 2:
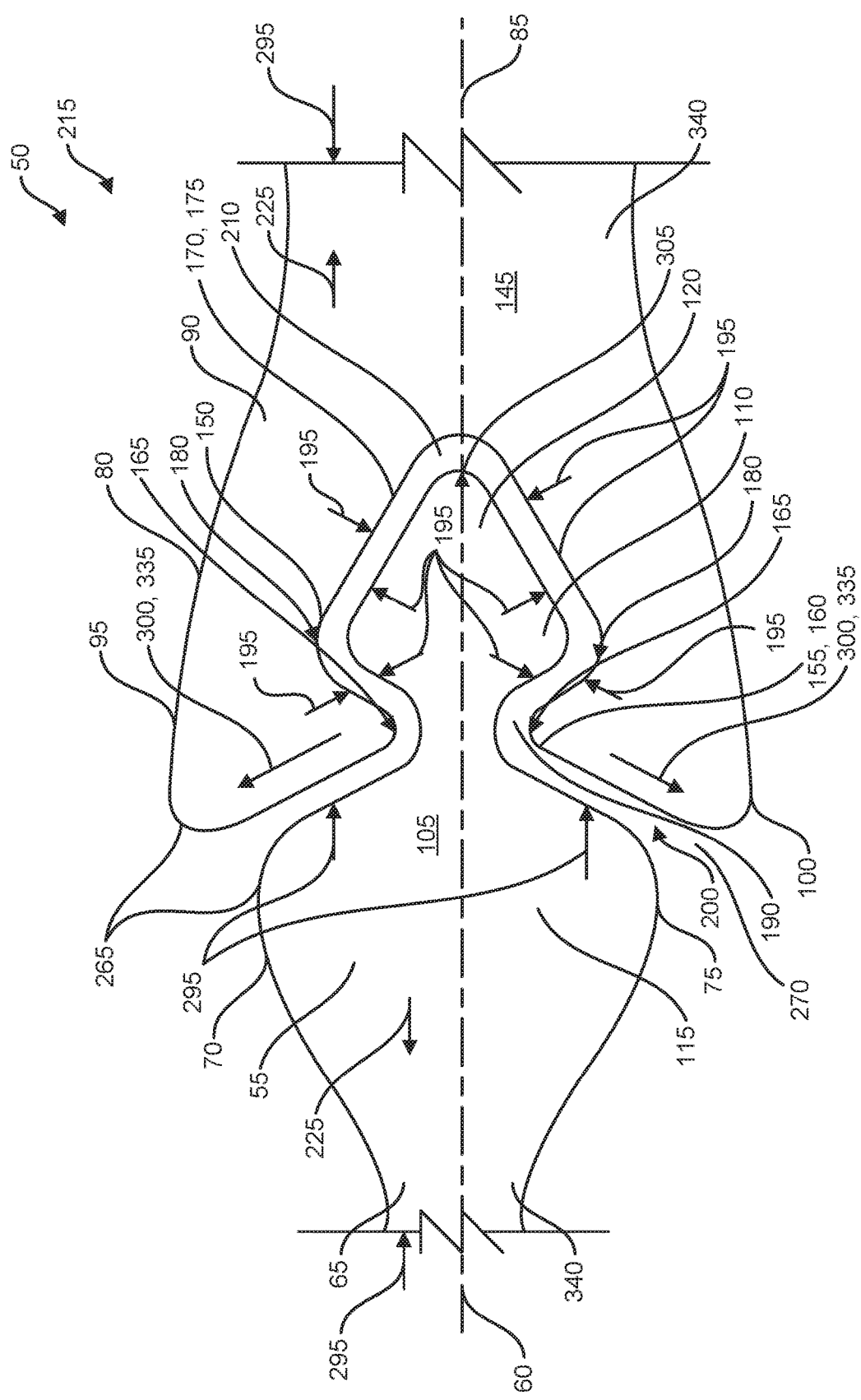
FIG. 2 shows a cross sectional view of the connected state of the first member flexible male configuration and the second member flexible female configuration, wherein the flexible male configuration includes the necked portion and the expanded head portion and the flexible female configuration includes the narrow duct portion and the chamber portion, the FIG. 2 view is shown as taken from FIGS. 4 and 5, wherein as both the male and female configurations are flexible they are removably engageable to one another, the expanded head portion is manually pushed into the narrow duct portion and continuing further to manually push the expanded head portion into the chamber portion until the expanded head portion bottoms out into the chamber portion resulting in the first and second members being in the substantially fluid tight connection to one another in the connected state as shown, however, noting that the primary and secondary interference fits are shown with an expanded gap for pictorial clarity wherein in their actual connected state the gap is substantially zero, to separate the first and the second members from one another manually pull apart the first and second members from one another into the separated state as shown in FIG. 1.
Figure 4:
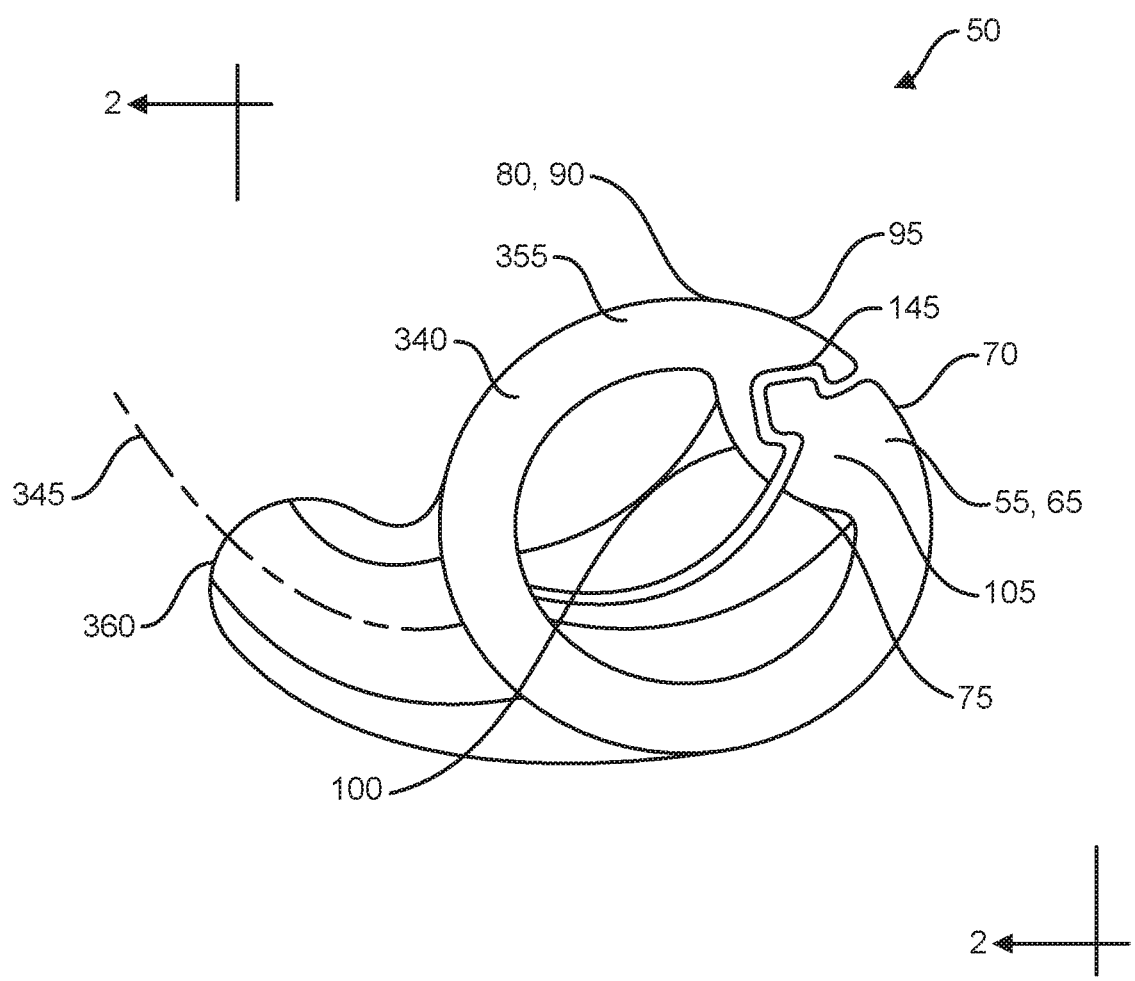
FIG. 4 shows an end perspective view of the connection device with the flexible surrounding sidewall having the flexible male and female configurations in the connected state to show the flexible sidewall first and second margin members connected in the substantially fluid tight connection in the connected state, wherein the flexible surrounding sidewall in the connected state can function as a straw as shown, however, noting that the male and female configurations are shown with an expanded gap between one another for pictorial clarity wherein in their actual connected state the gap is substantially zero.
Figure 5:
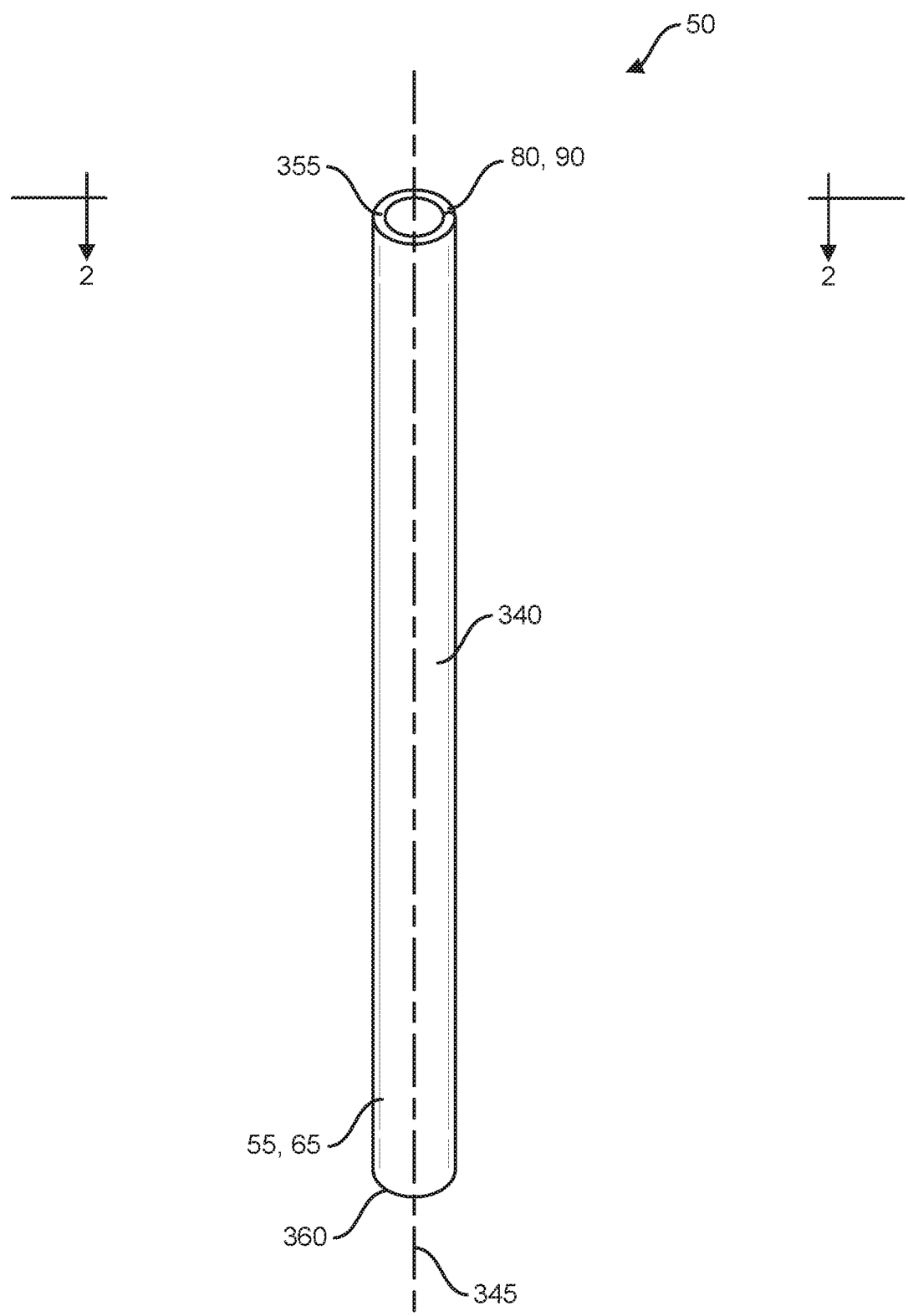
FIG. 5 shows an upper perspective view of the connection device with the flexible surrounding sidewall having the flexible male and female configurations in the connected state to show the flexible sidewall first and second margin members connected in the substantially fluid tight connection, wherein the flexible surrounding sidewall in the connected state can function as a straw as shown.

Continuing, FIG. 2 shows a cross sectional view of the connected state 215 of the first member 55 flexible male configuration 105 and the second member 80 flexible female configuration 145, wherein the flexible male configuration 105 includes the necked portion 125 and the expanded head portion 135 and the flexible female configuration 145 includes the narrow duct portion 155 and the chamber portion 170, FIG. 2 view is shown as taken from FIGS. 4 and 5. Wherein as both the male 105 and female 145 configurations are flexible as they are removably engageable to one another, the expanded head portion 135 is manually pushed 205 into the narrow duct portion 155 and continuing further to manually push 205 the expanded head portion 135 into the chamber portion 170 until the expanded head portion 135 bottoms out 210 into the chamber portion 170 resulting in the first 55 and second 80 members being in the substantially fluid tight connection 200 to one another in the connected state 215 as shown. However, noting that the primary 190 and secondary 195 interference fits are shown with an expanded gap for pictorial clarity wherein in their actual connected state 215 the gap is substantially zero. To separate the first 55 and the second 80 members from one another manually pull apart 225 the first 55 and second 80 members from one another into the separated state 220 as shown in FIG. 1.

Next, FIG. 3 shows a lower perspective view of the connection device 50 with the flexible surrounding sidewall 340 having the flexible male 105 and female 145 configurations partially in the separated state 220 and partially in the connected state 215 to show the flexible surrounding sidewall 340 first 55 and second 80 margin members connected in the substantially fluid tight connection 200 and the flexible surrounding sidewall 340 first 55 and second 80 margin members in the separated state 220, wherein the flexible surrounding sidewall 340 in the connected state 215 can function as a straw and the flexible surrounding sidewall 340 in the separated state 220 facilitating easy cleaning on the straw or the flexible surrounding sidewall 340 interior.

Moving onward, FIG. 4 shows an end perspective view of the connection device 50 with the flexible surrounding sidewall 340 having the flexible male 105 and female 145 configurations in the connected state 215 to show the flexible surrounding sidewall 340 first 55 and second 80 margin members connected in the substantially fluid tight connection 200, wherein the flexible surrounding sidewall 340 in the connected state 215 can function as a straw as shown, however, noting that the male 105 and female 145 configurations are shown with an expanded gap between one another for pictorial clarity wherein in their actual connected state 215 the gap is substantially zero;

Continuing, FIG. 5 shows an upper perspective view of the connection device 50 with the flexible surrounding sidewall 340 having the flexible male 105 and female 145 configurations in the connected state 215 to show the flexible surrounding sidewall 340 first 55 and second 80 margin members connected 215 in the substantially fluid tight connection 200, wherein the flexible surrounding sidewall 340 in the connected state 215 can function as a straw as shown.

Further, FIG. 6 shows a upper perspective view of the connection device 50 with the flexible surrounding sidewall 340 having the flexible male 105 and female 145 configurations in the separated state 220 to show the flexible surrounding sidewall 340 first 55 and second 80 margin members in the separated state 220, wherein the flexible surrounding sidewall 340 in the separated state 220 facilitating easy cleaning of the straw interior.

Figure 7:
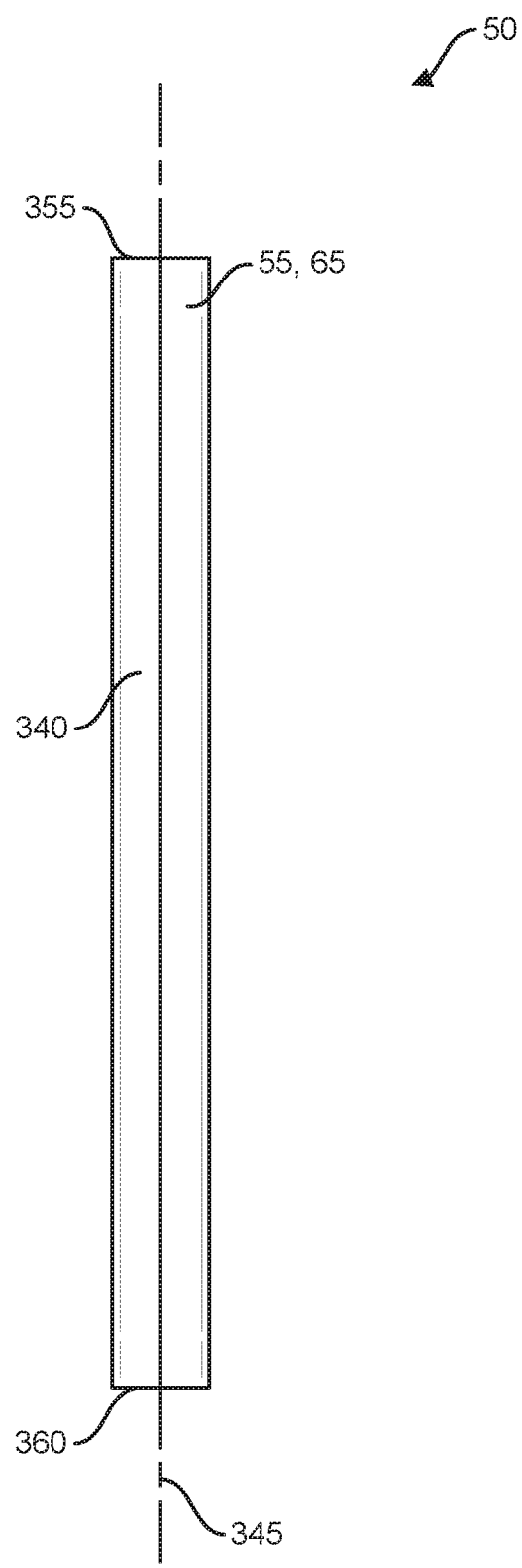
FIG. 7 shows an side elevation view of the connection device with the flexible surrounding sidewall having the flexible male and female configurations in the connected state to show the flexible sidewall first and second margin members connected in the substantially fluid tight connection as facing the FIG. 7 view via the vertical line that is co-incident with the surrounding sidewall long axis, wherein the flexible surrounding sidewall in the connected state can function as a straw as shown.

Also, FIG. 7 shows an side elevation view of the connection device 50 with the flexible surrounding sidewall 340 having the flexible male 105 and female 145 configurations in the connected state 215 to show the flexible surrounding sidewall 340 first 55 and second 80 margin members connected 215 in the substantially fluid tight connection 200 as facing the FIG. 7 view via the vertical line that is co-incident with the surrounding sidewall long axis 345, wherein the flexible surrounding sidewall 340 in the connected state 215 can function as a straw as shown.

Figure 8:
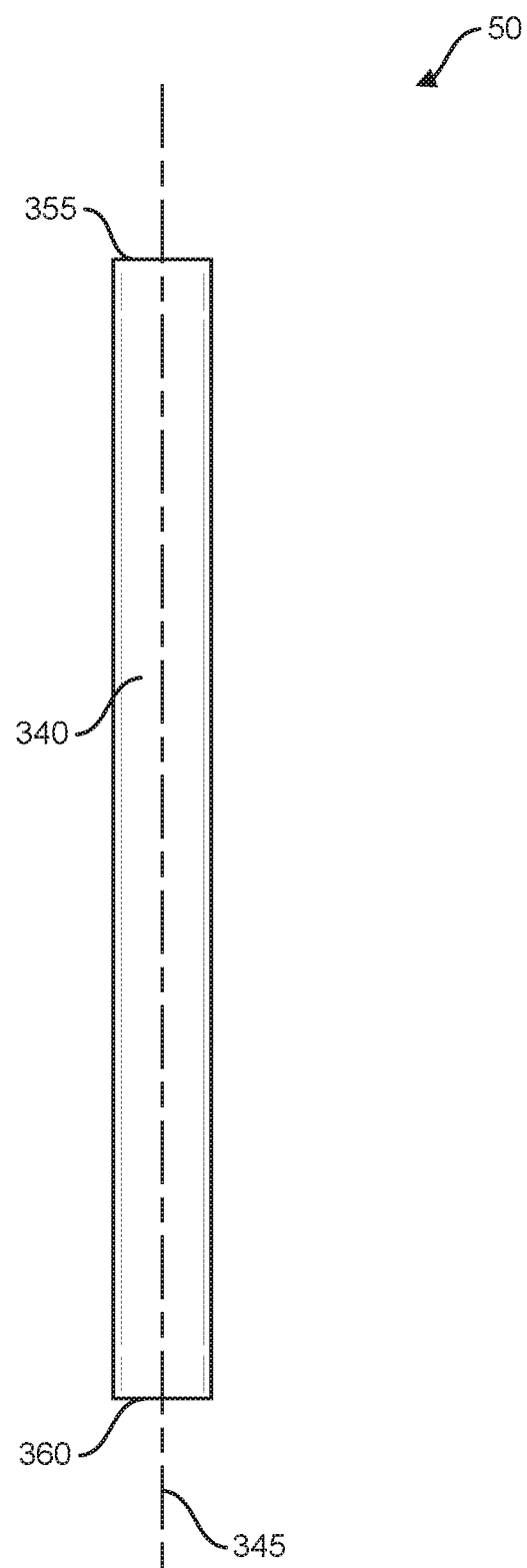
FIG. 8 shows a side elevation view of the connection device with the flexible surrounding sidewall having the flexible male and female configurations in the connected state to show the flexible sidewall first and second margin members connected in the substantially fluid tight connection, wherein the flexible surrounding sidewall in the connected state can function as a straw as shown.

Further, FIG. 8 shows a side elevation view of the connection device 50 with the flexible surrounding sidewall 340 having the flexible male 105 and female 145 configurations in the connected state 215 to show the flexible surrounding sidewall 340 first 55 and second 80 margin members connected 215 in the substantially fluid tight connection 200, wherein the flexible surrounding sidewall 340 in the connected state 215 can function as a straw as shown.

Figure 9:
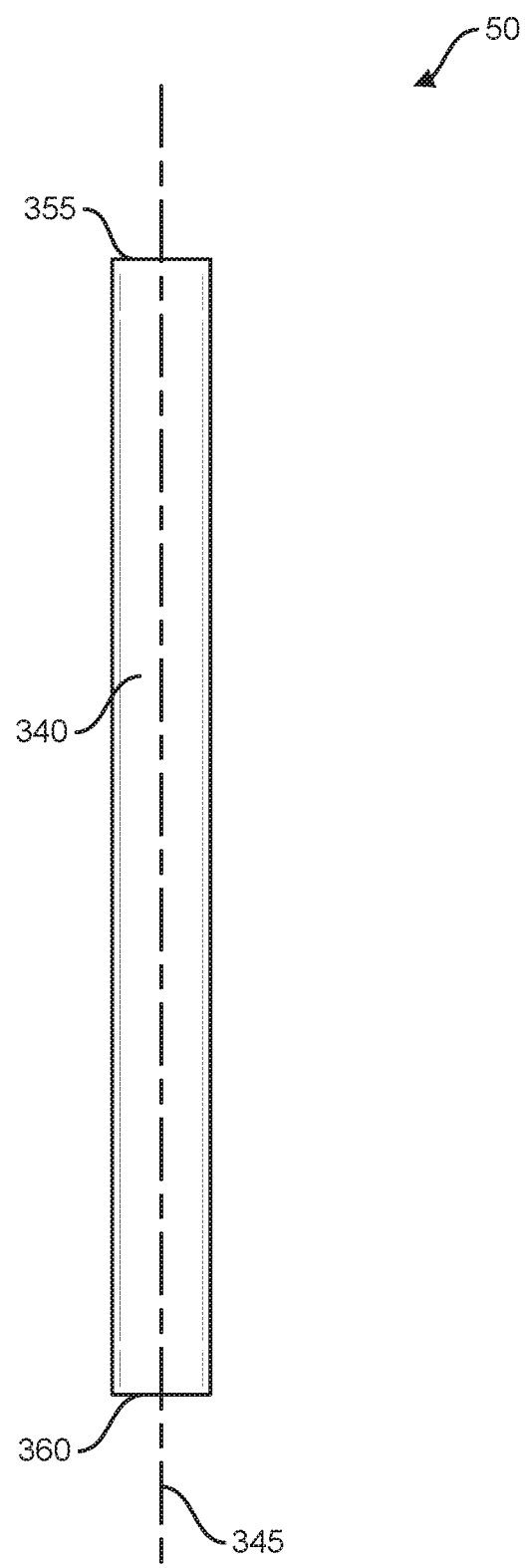
FIG. 9 shows an opposing side elevation view of FIG. 8 of the connection device with the flexible surrounding sidewall having the flexible male and female configurations in the connected state to show the flexible sidewall first and second margin members connected in the substantially fluid tight connection, wherein the flexible surrounding sidewall in the connected state can function as a straw as shown.

Moving onward, FIG. 9 shows an opposing side elevation view of FIG. 8 of the connection device 50 with the flexible surrounding sidewall 340 having the flexible male 105 and female 145 configurations in the connected state 215 to show the flexible surrounding sidewall 340 first 55 and second 80 margin members connected in the substantially fluid tight connection 200, wherein the flexible surrounding sidewall 340 in the connected state 215 can function as a straw as shown.

Figure 10:
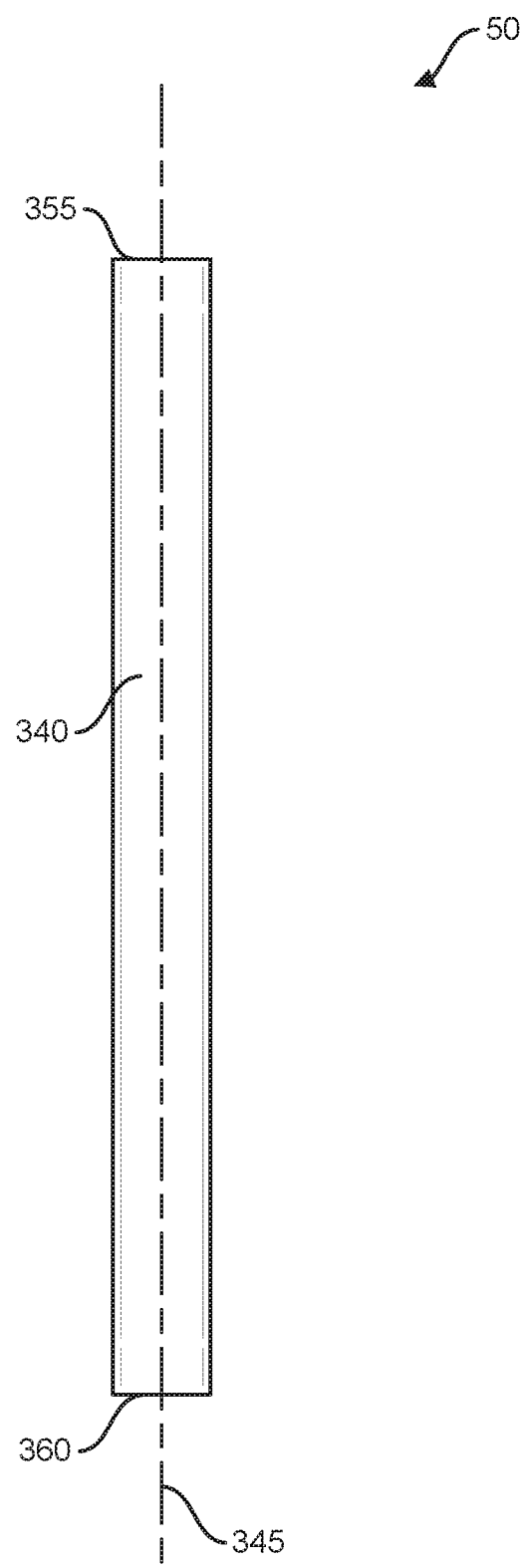
FIG. 10 shows an opposing side elevation view of FIG. 7 of the connection device with the flexible surrounding sidewall having the flexible male and female configurations in the connected state to show the flexible sidewall first and second margin members connected in the substantially fluid tight connection, wherein the flexible surrounding sidewall in the connected state can function as a straw as shown.

Next, FIG. 10 shows an opposing side elevation view of FIG. 7 of the connection device 50 with the flexible surrounding sidewall 340 having the flexible male 105 and female 145 configurations in the connected state 215 to show the flexible surrounding sidewall 340 first 55 and second 80 margin members connected 215 in the substantially fluid tight connection 200, wherein the flexible surrounding sidewall 340 in the connected state 215 can function as a straw as shown.

Figure 11:
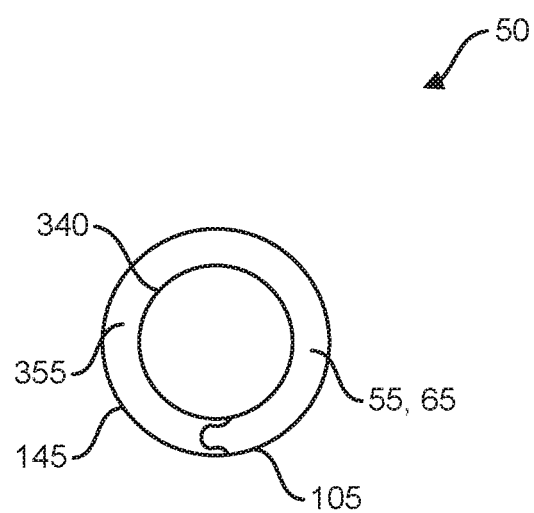
FIG. 11 shows a bottom end view of the connection device with the flexible surrounding sidewall having the flexible male and female configurations in the connected state to show the flexible sidewall first and second margin members connected in the substantially fluid tight connection, wherein the flexible surrounding sidewall in the connected state can function as a straw as shown.

Continuing, FIG. 11 shows a bottom end view of the connection device 50 with the flexible surrounding sidewall 340 having the flexible male 105 and female 145 configurations in the connected state 215 to show the flexible surrounding sidewall 340 first 55 and second 80 margin members connected in the substantially fluid tight connection 200, wherein the flexible surrounding sidewall 340 in the connected state 215 can function as a straw as shown.

Figure 12:
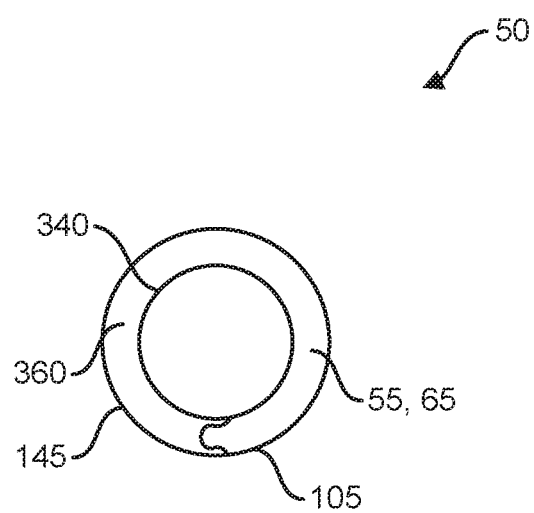
FIG. 12 shows a top end view of the connection device with the flexible surrounding sidewall having the flexible male and female configurations in the connected state to show the flexible sidewall first and second margin members connected in the substantially fluid tight connection, wherein the flexible surrounding sidewall in the connected state can function as a straw as shown.

Next, FIG. 12 shows a top end view of the connection device 50 with the flexible surrounding sidewall 340 having the flexible male 105 and female 145 configurations in the connected state 215 to show the flexible surrounding sidewall 340 first 55 and second 80 margin members connected in the substantially fluid tight connection 200, wherein the flexible surrounding sidewall 340 in the connected state 215 can function as a straw as shown.

Broadly, in looking at FIGS. 1 to 12, the present invention is a connection device 50 between a first member 55 and a second member 80 that includes a flexible male configuration 105 disposed on a first distal end portion 65 of the first member 55, the male configuration 105 includes a finger extension 110 having a proximal end portion 115 and an opposing distal end portion 120 with a first member 55 longitudinal axis 60 spanning therebetween the finger extension 110 proximal 115 and distal 120 end portions, wherein the finger extension 110 proximal end portion 115 has a necked portion 125 with a necked portion volume 130 and the finger extension 110 distal end portion 120 has an expanded head portion 135 having an expanded head portion 135 volume 140, see in particular FIG. 1.

Also included is a flexible female configuration 145 disposed on a second distal end portion 90 of the second member 80, the female configuration 145 includes a cavity 150 that is constructed of a narrow duct portion 155 defined by a narrow duct portion boundary 160 that expands into a chamber portion 170 defined by a chamber portion boundary 175 with a second member 80 longitudinal axis 85 spanning therebetween the narrow duct portion 155 and the chamber portion 170, see FIGS. 1 and 2. Wherein the narrow duct portion 155 has a narrow duct portion void volume 165 and the chamber portion 170 has a chamber portion void volume 180, wherein the first member 55 longitudinal axis 60 and the second member 80 longitudinal axis 85 are coincident 185 to one another. Wherein the narrow duct portion void volume 165 is less than the necked portion volume 130 and the chamber portion void volume 180 is less than the expanded head portion volume 140 resulting in a primary interference fit 190 as between the narrow duct portion 155 and the necked portion 125 and a secondary interference fit 195 as between the chamber portion 170 and the expanded head portion 135 resulting in a substantially fluid tight connection 200 as between the first 55 and second 80 members, see FIGS. 1 and 2.

Wherein as both the male 105 and female 145 configurations are flexible they are removably engageable to one another, wherein operationally the first member longitudinal axis 60 and the second member longitudinal axis 85 are positioned coincident 185 to one another and the expanded head portion 135 is manually pushed 205 into the narrow duct portion 155 and continuing further to manually push 205 the expanded head portion 135 into the chamber portion 170 until the expanded head portion 135 bottoms out 210 into the chamber portion 170 resulting in the first 55 and second 80 members being in the substantially fluid tight connection 200 to one another in a connected state 215, to separate the first 55 and the second 80 members from one another manually pull apart 225 the first 55 and second 80 members from one another into a separated state 220 with the first member longitudinal axis 60 and the second member longitudinal axis 85 being positioned coincident 185 to one another, as best shown in FIGS. 1 and 2.

Optionally, for the connection device 50, the expanded head portion 135 can have a cross section shape of a rhombus 230 in a first plane 235 that is perpendicular 240 to the first member longitudinal axis 60 and the chamber portion boundary 175 has a shape of a rhombus 245 in a second plane 250 that is perpendicular 255 to the second member longitudinal axis 85, wherein as the rhombus shaped 230 expanded head portion 135 is manually inserted 205 into the rhombus 245 shaped chamber portion boundary 175 the secondary interference fit 195 is now defined by a series of four flat surfaces 260 that are operational to further enhance the substantial fluid tight connection 200, as best shown in FIGS. 1 and 2.

As another option for the connection device 50, the first member 55 has a first outer margin 70 and an opposing first inner margin 75, and the second member 80 has a second outer margin 95 and an opposing second inner margin 100 wherein when the first 55 and second 80 members are in the connected state 215 the first 70 and second outer margins 95 are adjacent 265 to one another and the first 75 and second 100 inner margins are adjacent 270 to one another. The first member distal end portion 65 has an first outer angled surface 275 that extends from the necked portion 125 to the first outer margin 70 in a first direction away 280 from the expanded head portion 135, further the first member distal end portion 65 has an first inner angled surface 285 that extends from the necked portion 125 to the first inner margin 75 in a second direction away 290 from the expanded head portion 135. Wherein operationally, when the first 55 and second 80 members are compressed 295 toward one another along the first 60 and second 85 member longitudinal axes, the first inner 285 and outer 275 angled surfaces reduce 300 the primary interference fit 190 to allow the expanded head portion 135 to drive further 305 into the chamber portion 170 to further enhance the substantial fluid tight connection 200, again see FIGS. 1 and 2.

Alternatively, for the connection device 50, the second member 80 distal end portion 90 has an second outer angled surface 310 that extends from the narrow ducted portion 155 to the second outer margin 95 in a third direction away 315 from the chamber portion 170, further the second member distal end portion 90 has an second inner angled surface 320 that extends from the narrow ducted portion 155 to the second inner margin 100 in a fourth direction away 325 from the chamber portion 170. Wherein operationally, when the first 55 and second 80 members are compressed 295 toward one another along the first 60 and second 85 member longitudinal axes, the first 275, 285 and second 310, 320 respectively inner and outer angled surfaces further reduce 335 the primary interference fit 190 to allow the expanded head portion 135 to drive further 305 into the chamber portion 170 to further enhance the substantial fluid tight connection 200, again see FIGS. 1 and 2.

Also for the connection device 50 between a first margin member 55 and a second margin member 80, includes a flexible male configuration 105 disposed on a first distal end portion 65 of the first margin member 55, the male configuration 105 includes a finger extension 110 having a proximal end portion 115 and an opposing distal end portion 120 with a first margin member 55 longitudinal axis 60 spanning therebetween the finger extension 110 proximal 115 and distal 120 end portions, wherein the finger extension 110 proximal end portion 115 has a necked portion 125 with a necked portion volume 130 and the finger extension 110 distal end portion 120 has an expanded head portion 135 having an expanded head portion 135 volume 140, see in particular FIG. 1.

Also included is a flexible female configuration 145 disposed on a second distal end portion 90 of the second margin member 80, the female configuration 145 includes a cavity 150 that is constructed of a narrow duct portion 155 defined by a narrow duct portion boundary 160 that expands into a chamber portion 170 defined by a chamber portion boundary 175 with a second margin member 80 longitudinal axis 85 spanning therebetween the narrow duct portion 155 and the chamber portion 170, see FIGS. 1 and 2. Wherein the narrow duct portion 155 has a narrow duct portion void volume 165 and the chamber portion 170 has a chamber portion void volume 180, wherein the first margin member 55 longitudinal axis 60 and the second margin member 80 longitudinal axis 85 are coincident 185 to one another. Wherein the narrow duct portion void volume 165 is less than the necked portion volume 130 and the chamber portion void volume 180 is less than the expanded head portion volume 140 resulting in a primary interference fit 190 as between the narrow duction portion 155 and the necked portion 125 and a secondary interference fit 195 as between the chamber portion 170 and the expanded head portion 135 resulting in a substantially fluid tight connection 200 as between the first 55 and second 80 margin members, again see FIGS. 1 and 2.

Wherein as both the male 105 and female 145 configurations are flexible they are removably engageable to one another, wherein operationally the first margin member longitudinal axis 60 and the second margin member longitudinal axis 85 are positioned coincident 185 to one another and the expanded head portion 135 is manually pushed 205 into the narrow duct portion 155 and continuing further to manually push 205 the expanded head portion 135 into the chamber portion 170 until the expanded head portion 135 bottoms out 210 into the chamber portion 170 resulting in the first 55 and second 80 margin members being in the substantially fluid tight connection 200 to one another in a connected state 215. To separate the first 55 and the second 80 margin members from one another, manually pull apart 225 the first 55 and second 80 margin members from one another in a separated state 220 with the first margin member longitudinal axis 60 and the second margin member longitudinal axis 85 being positioned coincident 185 to one another, again see FIGS. 1 and 2.

Further included in the connection device 50 is a flexible surrounding sidewall 340 that is about a long axis 345, wherein the surrounding sidewall 340 terminates in the first margin member 55 that is parallel 350 to the long axis 345 and the second margin member 80 that is parallel 350 to the long axis 345, wherein the surrounding sidewall 340 further terminates in a first end margin 355 that is perpendicular 365 to the long axis 345 and also terminates in an opposing second end margin 360 that is perpendicular 365 to the long axis 345, see FIGS. 3 to 12 specifically and FIGS. 1 and 2 for ancillary support.

Optionally, for the connection device 50, the expanded head portion 135 can have a cross section shape of a rhombus 230 in a first plane 235 that is perpendicular 240 to the first margin member longitudinal axis 60 and the chamber portion boundary 175 has a shape of a rhombus 245 in a second plane 250 that is perpendicular 255 to the second margin member longitudinal axis 85, wherein as the rhombus shaped 230 expanded head portion 135 is manually inserted 205 into the rhombus 245 shaped chamber portion boundary 175 the secondary interference fit 195 is now defined by a series of four flat surfaces 260 that are operational to further enhance the substantial fluid tight connection 200, see FIGS. 1 and 2.

Another option for the connection device 50, the first margin member 55 has a first outer margin 70 and an opposing first inner margin 75, and the second margin member 80 has a second outer margin 95 and an opposing second inner margin 100 wherein when the first 55 and second 80 margin members are in the connected state 215 the first 70 and second 95 outer margins are adjacent 265 to one another and the first 75 and second 100 inner margins are adjacent 270 to one another, the first margin member distal end portion 65 has an first outer angled surface 275 that extends from the necked portion 125 to the first outer margin 70 in a first direction away 280 from the expanded head portion 135 further the first margin member distal end portion 65 has an first inner angled surface 285 that extends from the necked portion 125 to the first inner margin 75 in a second direction away 290 from the expanded head portion 135. Wherein, operationally when the first 55 and second 80 members are compressed 295 toward one another along the first 60 and second 85 margin member longitudinal axes the first inner 285 and outer 275 angled surfaces reduce 300 the primary interference fit 190 to allow the expanded head portion 135 to drive further 305 into the chamber portion 170 to further enhance the substantial fluid tight connection 200, see FIGS. 1 and 2.

Alternatively, for the connection device 50, the second margin member 80 distal end portion 90 has a second outer angled surface 310 that extends from said narrow ducted portion 155 to the second outer margin 95 in a third direction away 315 from the chamber portion 170 further the second margin member distal end portion 90 has a second inner angled surface 320 that extends from the narrow ducted portion 155 to the second inner margin 100 in a fourth direction away 325 from the chamber portion 170. Wherein operationally when the first 55 and second 80 margin members are compressed 295 toward one another along the first 60 and second 85 margin member longitudinal axes the first 275, 285 and second 310, 320 respectively inner and outer angled surfaces further reduce 335 the primary interference fit 190 to allow the expanded head portion 135 to drive further 305 into the chamber portion 170 to further enhance the substantial fluid tight connection 200, see FIGS. 1 and 2.

CONCLUSION

Accordingly, the present invention of a connection device has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A connection device between a first member and a second member, comprising:
   (a) a flexible male configuration disposed on a first distal end portion of said first member, said male configuration includes a finger extension having a proximal end portion and an opposing distal end portion with a first member longitudinal axis spanning therebetween said finger extension proximal and distal end portions, wherein said finger extension proximal end portion has a necked portion with a necked portion volume and said finger extension distal end portion has an expanded head portion having an expanded head portion volume; and
   (b) a flexible female configuration disposed on a second distal end portion of said second member, said female configuration includes a cavity that is constructed of a narrow duct portion defined by a narrow duct portion boundary that expands into a chamber portion defined by a chamber portion boundary with a second member longitudinal axis spanning therebetween said narrow duct portion and said chamber portion, wherein said narrow duct portion has a narrow duct portion void volume and said chamber portion has a chamber portion void volume, wherein said first member longitudinal axis and said second member longitudinal axis are coincident to one another, wherein said narrow duct portion void volume is less than said necked portion volume and said chamber portion void volume is less than said expanded head portion volume resulting in a primary interference fit as between said narrow duct portion and said necked portion and a secondary interference fit as between said chamber portion and said expanded head portion resulting in a substantially fluid tight connection as between said first and second members, wherein as both said male and female configurations are flexible they are removably engageable to one another, wherein said expanded head portion has a cross section shape of a rhombus in a first plane that is perpendicular to said first member longitudinal axis and said chamber portion boundary has a shape of a rhombus in a second plane that is perpendicular to said second member longitudinal axis, further wherein operationally said first member longitudinal axis and said second member longitudinal axis are positioned coincident to one another and said expanded head portion is manually pushed into said narrow duct portion and continuing further to manually push said expanded head portion into said chamber portion until said expanded head portion bottoms out into said chamber portion resulting in said first and second members being in said substantially fluid tight connection to one another in a connected state, wherein as said rhombus shaped expanded head portion is manually inserted into said rhombus shaped chamber portion boundary said secondary interference fit is now defined by a series of four flat surfaces that are operational to further enhance said substantial fluid tight connection, wherein said first member has a first outer margin and an opposing first inner margin, and said second member has a second outer margin and an opposing second inner margin wherein when said first and second members are in said connected state said first and second outer margins are adjacent to one another and said first and second inner margins are adjacent to one another, said first member distal end portion has an first outer angled surface that extends from said necked portion to said first outer margin in a first direction away from said expanded head portion further said first member distal end portion has an first inner angled surface that extends from said necked portion to said first inner margin in a second direction away from said expanded head portion, wherein operationally when said first and second members are compressed toward one another along said first and second member longitudinal axes said first inner and outer angled surfaces reduce said primary interference fit to allow said expanded head portion to drive further into said chamber portion to further enhance said substantial fluid tight connection, to separate said first and said second members from one another manually pull apart said first and second members from one another into a separated state with said first member longitudinal axis and said second member longitudinal axis being positioned coincident to one another.

2. A connection device according to claim 1 wherein said second member distal end portion has an second outer angled surface that extends from said narrow ducted portion to said second outer margin in a third direction away from said chamber portion further said second member distal end portion has an second inner angled surface that extends from said narrow ducted portion to said second inner margin in a fourth direction away from said chamber portion, wherein operationally when said first and second members are compressed toward one another along said first and second member longitudinal axes said first and second inner and outer angled surfaces further reduce said primary interference fit to allow said expanded head portion to drive further into said chamber portion to further enhance said substantial fluid tight connection.

3. A connection device between a first margin member and a second margin member, comprising:
   (a) a flexible male configuration disposed on a first distal end portion of said first margin member, said male configuration includes a finger extension having a proximal end portion and an opposing distal end portion with a first margin member longitudinal axis spanning therebetween said finger extension proximal and distal end portions, wherein said finger extension proximal end portion has a necked portion with a necked portion volume and said finger extension distal end portion has an expanded head portion having an expanded head portion volume;
   (b) a flexible female configuration disposed on a second distal end portion of said second margin member, said female configuration includes a cavity that is constructed of a narrow duct portion defined by a narrow duct portion boundary that expands into a chamber portion defined by a chamber portion boundary with a second margin member longitudinal axis spanning therebetween said narrow duct portion and said chamber portion, wherein said narrow duct portion has a narrow duct portion void volume and said chamber portion has a chamber portion void volume, wherein said first margin member longitudinal axis and said second margin member longitudinal axis are coincident to one another, wherein said narrow duct portion void volume is less than said necked portion volume and said chamber portion void volume is less than said expanded head portion volume resulting in a primary interference fit as between said narrow duct portion and said necked portion and a secondary interference fit as between said chamber portion and said expanded head portion resulting in a substantially fluid tight connection as between said first and second margin members, wherein as both said male and female configurations are flexible they are removably engageable to one another, wherein said expanded head portion has a cross section shape of a rhombus in a first plane that is perpendicular to said first margin member longitudinal axis and said chamber portion boundary has a shape of a rhombus in a second plane that is perpendicular to said second margin member longitudinal axis, wherein operationally said first margin member longitudinal axis and said second margin member longitudinal axis are positioned coincident to one another and said expanded head portion is manually pushed into said narrow duct portion and continuing further to manually push said expanded head portion into said chamber portion until said expanded head portion bottoms out into said chamber portion resulting in said first and second margin members being in said substantially fluid tight connection to one another in a connected state, wherein as said rhombus shaped expanded head portion is manually inserted into said rhombus shaped chamber portion boundary said secondary interference fit is now defined by a series of four flat surfaces that are operational to further enhance said substantial fluid tight connection, wherein said first margin member has a first outer margin and an opposing first inner margin, and said second margin member has a second outer margin and an opposing second inner margin wherein when said first and second margin members are in said connected state said first and second outer margins are adjacent to one another and said first and second inner margins are adjacent to one another, said first margin member distal end portion has an first outer angled surface that extends from said necked portion to said first outer margin in a first direction away from said expanded head portion further said first margin member distal end portion has an first inner angled surface that extends from said necked portion to said first inner margin in a second direction away from said expanded head portion, wherein operationally when said first and second members are compressed toward one another along said first and second margin member longitudinal axes said first inner and outer angled surfaces reduce said primary interference fit to allow said expanded head portion to drive further into said chamber portion to further enhance said substantial fluid tight connection, to separate said first and said second margin members from one another, manually pull apart said first and second margin members from one another into a separated state with said first margin member longitudinal axis and said second margin member longitudinal axis being positioned coincident to one another; and
   (c) a flexible surrounding sidewall that is about a long axis, wherein said surrounding sidewall terminates in said first margin member that is parallel to said long axis and said second margin member that is parallel to said long axis, wherein said surrounding sidewall further terminates in a first end margin that is perpendicular to said long axis and also terminates in an opposing second end margin that is perpendicular to said long axis.

4. A connection device according to claim 3 wherein said second margin member distal end portion has an second outer angled surface that extends from said narrow ducted portion to said second outer margin in a third direction away from said chamber portion further said second margin member distal end portion has an second inner angled surface that extends from said narrow ducted portion to said second inner margin in a fourth direction away from said chamber portion, wherein operationally when said first and second margin members are compressed toward one another along said first and second margin member longitudinal axes said first and second inner and outer angled surfaces further reduce said primary interference fit to allow said expanded head portion to drive further into said chamber portion to further enhance said substantial fluid tight connection.

* * * * *